United States Patent
Jeon

(10) Patent No.: US 6,741,792 B1
(45) Date of Patent: May 25, 2004

(54) VARIABLE SPEED PLAYBACK METHOD AND APPARATUS FOR PLAYING BACK DIGITAL DATA STORED IN A RECORDING MEDIUM

(75) Inventor: Jin-kyu Jeon, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/460,976

(22) Filed: Dec. 15, 1999

(30) Foreign Application Priority Data

Dec. 15, 1998 (KR) .............................. 98-55037

(51) Int. Cl.⁷ ................................ H04N 5/91
(52) U.S. Cl. ...................... 386/68; 386/31; 386/111
(58) Field of Search ............................ 386/68, 69, 80, 386/81, 109, 111, 112; H04N 5/91

(56) References Cited

U.S. PATENT DOCUMENTS

| | | | |
|---|---|---|---|
| 5,587,806 A | * 12/1996 | Yamada et al. | 386/68 |
| 5,692,092 A | * 11/1997 | Nogami et al. | 386/68 |
| 5,717,816 A | * 2/1998 | Boyce et al. | 386/111 |
| 5,987,212 A | * 11/1999 | Kim et al. | 386/68 |

FOREIGN PATENT DOCUMENTS

| KR | 96-8788 | 3/1996 |
|---|---|---|
| KR | 97-76677 | 12/1997 |

* cited by examiner

*Primary Examiner*—Vincent Boccio
(74) *Attorney, Agent, or Firm*—Sughrue Mion, PLLC

(57) ABSTRACT

A variable speed playback method and apparatus is provided. The variable speed playback apparatus includes a transfer unit for moving a recording medium, a controller for controlling the transfer unit so as to repeatedly perform a fast transfer operation for moving the recording medium at a high speed and a normal playback operation for playing back the data of the recording medium at a normal playback speed after the fast transfer operation, and a restoring unit for reconstructing data, which is read from the recording medium during each period of the normal playback operation, to at least one picture of display data, thereby easily implementing variable speed playback without increasing the cost or structural complication of products.

35 Claims, 3 Drawing Sheets

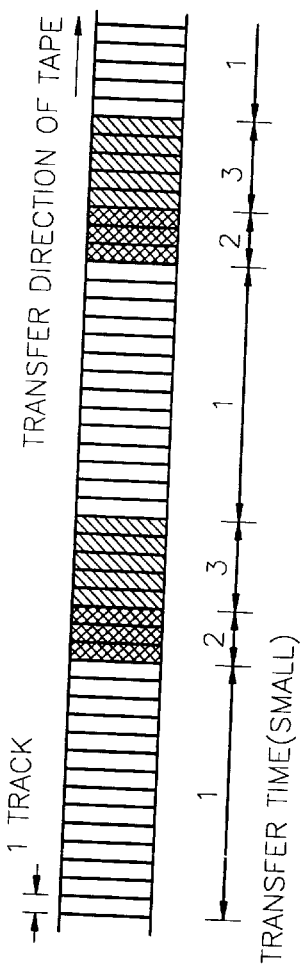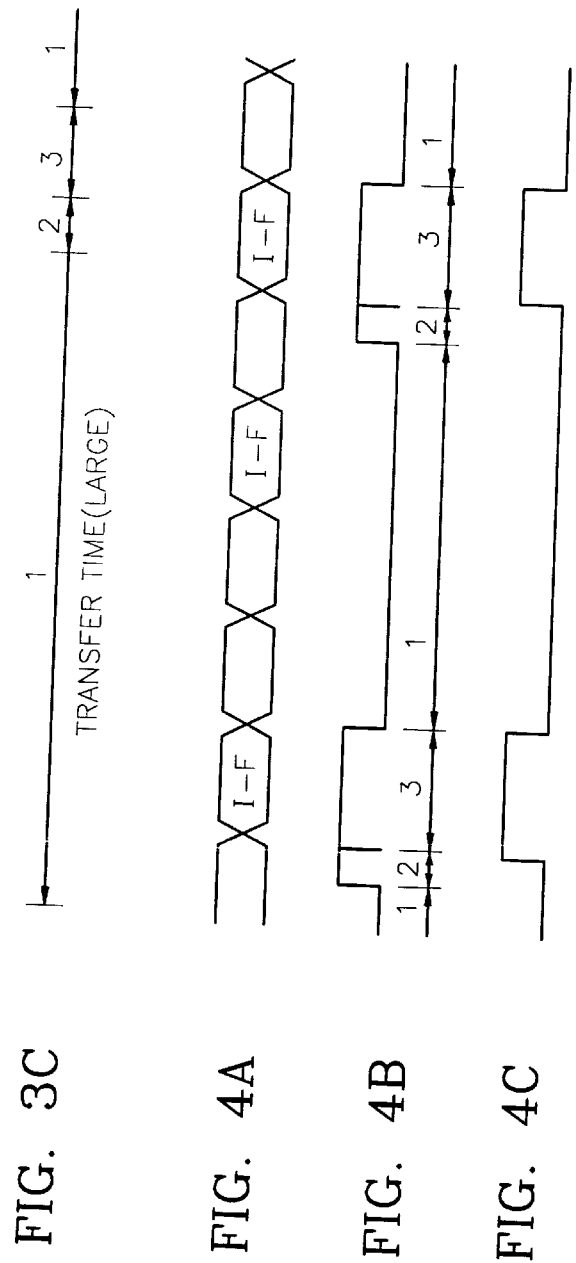
FIG. 3A
FIG. 3B
FIG. 3C
FIG. 4A
FIG. 4B
FIG. 4C

VARIABLE SPEED PLAYBACK METHOD AND APPARATUS FOR PLAYING BACK DIGITAL DATA STORED IN A RECORDING MEDIUM

BACKGROUND OF THE INVENTION

1. Field of the Invention

The present invention relates to digital recording and/or playback, and more particularly, to a variable speed playback method and apparatus for controlling a fast transfer operation and a normal speed playback operation without reconstructing and recording separate data for variable speed playback.

2. Description of the Related Art

A digital video cassette recorder (VCR) is an example of a digital recording and playback apparatus. A recording medium used in the digital VCR is separately assigned an area in which normal speed playback data is recorded and an area in which variable speed playback (which can be referred to as trick play) data is recorded. This is for performing variable speed playback without influencing normal speed playback by recording separate data only for the variable speed playback in a position which is traced by a playback head and by playing back the separate data.

FIG. 1 is a block diagram of a conventional digital VCR which separately records normal speed playback data and variable speed playback data as described above. The conventional digital VCR includes a separate encoder 104 and a separate decoder 118 for variable speed recording and playback, respectively, in addition to an encoder 102 and a decoder 116 for normal speed recording and playback, respectively.

The normal speed recording data encoder 102 converts an input Moving Picture Experts Group (MPEG)-2 bit stream into data, which can be recorded in a digital VCR, and provides the data to a multiplexer (MUX) 106. The variable speed recording data encoder 104 recompresses an intra picture which is extracted from the input MPEG-2 bit stream to generate recording data for variable speed playback and provides the recording data to the multiplexer 106.

The multiplexer 106 time-division multiplexes the recording data for normal speed playback, which is provided from the normal speed recording data encoder 102, and the recording data for variable speed playback, which is provided from the variable speed recording data encoder 104, and provides the output thereof to a recording signal processor 108. The recording signal processor 108 includes a recording amplifier and a channel modulator and error correction code (ECC) encoder, and generates an error correction coded bit stream. The error correction coded bit stream is recorded in a recording medium 112 in the form of a magnetic signal through an electricity/magnetism transducer 110.

The normal speed recording data and the variable speed recording data, which are separately recorded in a recording medium, are played back as follows according to a normal speed playback mode and a variable speed playback mode, respectively. Primarily, a signal which is read from the recording medium 112 is provided in the form of an electrical signal to a playback signal processor 114 via the electricity/magnetism transducer 100. The playback signal processor 104 includes a playback amplifier, an equalizer and a channel demodulator and ECC decoder, and provides an error correction decoded bit stream to both the normal speed playback data decoder 116 and the variable speed playback data decoder 118.

The normal speed playback data decoder 116 decodes the error correction decoded data for only normal speed playback and provides decoded data to a demultiplexer (DEMUX) 120. The variable speed playback data decoder 108 decodes the error correction decoded data for only variable speed playback and provides decoded data to the demultiplexer 120. In response to a normal/variable speed playback mode signal NORMAL/TRICK, the demultiplexer 120 outputs only a normal speed playback signal, which is decoded by the normal speed playback data decoder 116, in a normal speed playback mode and outputs only a variable speed playback signal, which is decoded by the variable speed playback data decoder 118, in a variable speed playback mode, thereby allowing normal speed playback or variable speed playback.

The variable speed recording data encoder 104 of the conventional digital VCR extracts only necessary data for variable speed playback from input normal speed recording data. Since sufficient recording area is not assigned to variable speed playback data, the variable speed playback data must be compressed for recording. Accordingly, picture quality can be degraded due to loss of information and excessive compression. Moreover, the conventional technology needs the separate encoder and decoder for variable speed recording and playback in addition to the encoder and decoder for normal speed recording and playback, thereby complicating the structure and increasing the cost.

SUMMARY OF THE INVENTION

To solve the above problems, it is an objective of the present invention to provide a variable speed playback method for controlling a fast transfer operation and a normal speed playback operation without reconstructing and recording separate data for variable speed playback.

It is another objective of the present invention to provide a variable speed playback apparatus for controlling a fast transfer operation and a normal speed playback operation without reconstructing and recording separate data for variable speed playback.

Accordingly, to achieve the above objectives, there is provided a variable speed playback method for helical scanning and playing back digital data stored in a recording medium. Fast transfer operation is performed on the recording medium in response to a variable speed mode. The variable speed mode is selected by a user interface. Data stored in the recording medium is played back at a normal playback speed after the fast transfer operation. Therefore, the fast transfer operation and the normal playback operation are repeatedly performed, thereby realizing variable speed playback.

To achieve the above objectives, there is also provided a variable speed playback apparatus for helically scanning and playing back digital data stored in a recording medium. The apparatus includes a transfer unit for moving the recording medium, a controller for controlling the transfer unit so as to repeatedly perform a fast transfer operation for moving the recording medium at a high speed and a normal playback operation for playing back the data of the recording medium at a normal playback speed after the fast transfer operation, and a restoring unit for reconstructing data, which is read from the recording medium during each period of the normal playback operation, to at least one picture of display data.

BRIEF DESCRIPTION OF THE DRAWINGS

The above objectives and advantages of the present invention will become more apparent by describing in detail a preferred embodiment thereof with reference to the attached drawings in which:

FIGS. 3A through 3C are diagrams for showing the operation principle of a variable speed playback method according to the present invention; and FIGS. 4A through 4C are timing diagrams of variable speed playback according to the present invention.

DETAILED DESCRIPTION OF THE INVENTION

Figure 1:
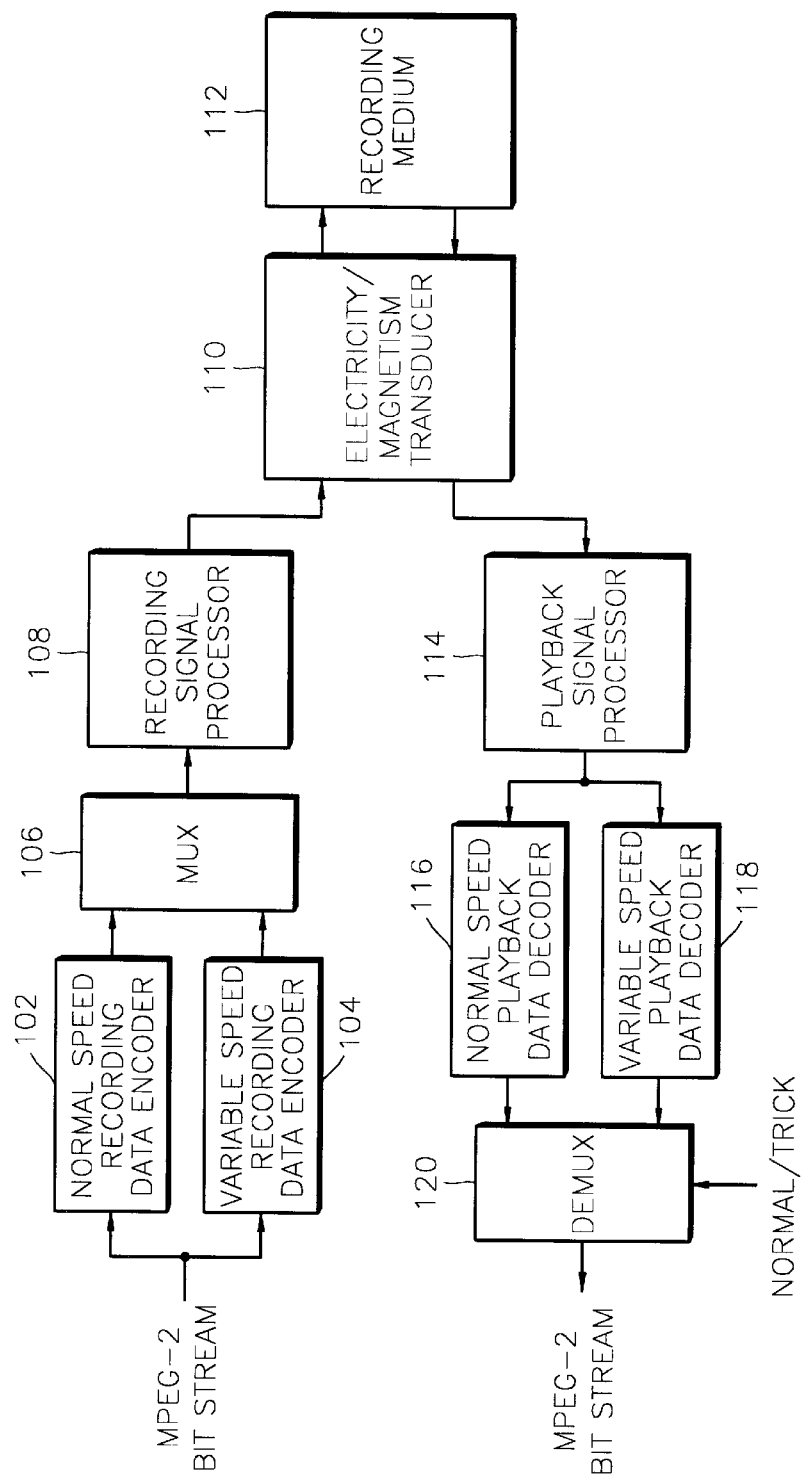
FIG. 1 is a block diagram of a conventional digital video cassette recorder.
Figure 2:
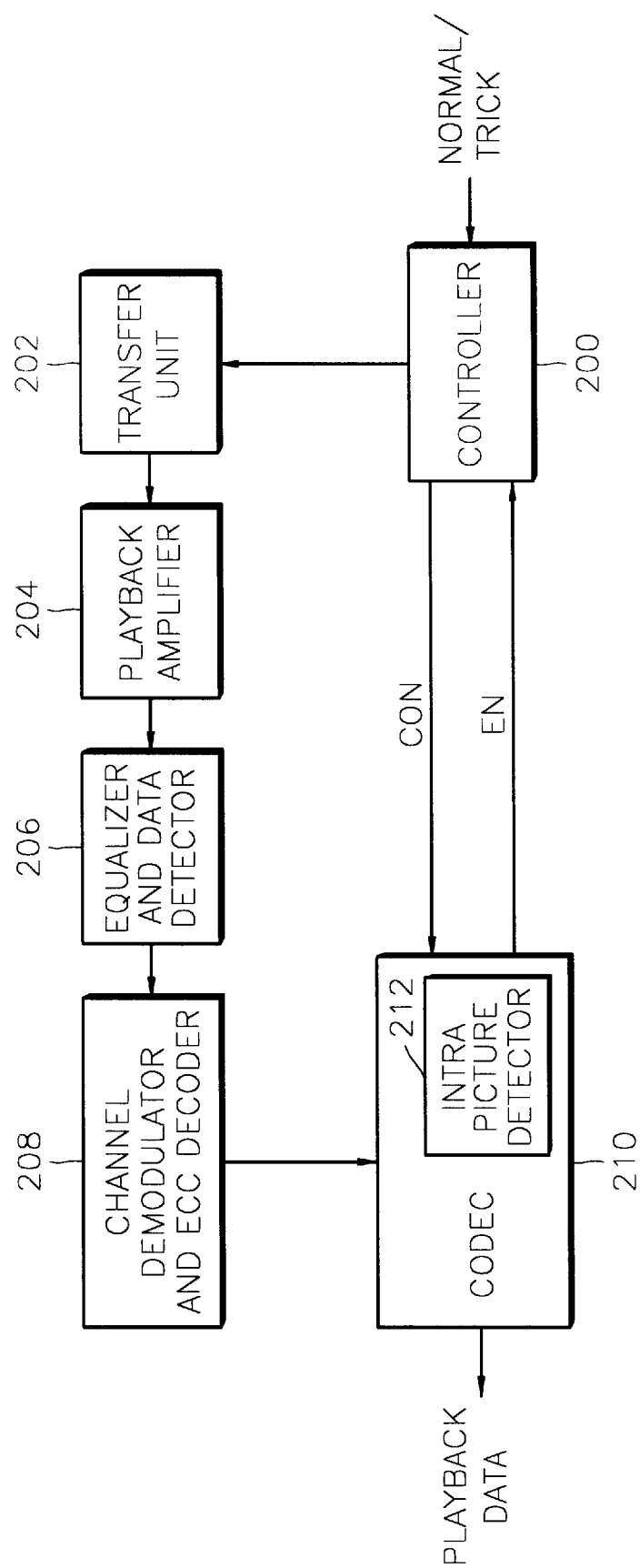
FIG. 2 is a block diagram of a variable speed playback apparatus according to an embodiment of the present invention.

The present invention will now be described more fully with reference to the accompanying drawings, in which preferred embodiments of the invention are shown. Referring to FIG. 2, a variable speed playback apparatus according to an embodiment of the present invention includes a controller 200, a transfer unit 202, a playback amplifier 204, an equalizer and data detector 206, a channel demodulator and error correction code (ECC) decoder 208 and a codec 210 having an intra picture detector 212. The combination of the playback amplifier 204, the equalizer and data detector 206 and the channel demodulator and ECC decoder 208 is referred to as a playback signal processor and the codec 210 including the intra picture detector 212 is referred to as a restoring unit.

In FIG. 2, the transfer unit 202, which includes a deck mechanism, performs a variable speed playback mode under control of the controller 200 in a random access manner, combining a fast transfer operation and a normal playback operation. The playback amplifier 204 amplifies a playback signal, which is helically scanned and read by a head within the transfer unit 202, from a recording medium. The equalizer and data detector 206 equalizes the amplified playback signal and detects data of a binary information stream from the equalized signal. The channel demodulator and ECC decoder 208 performs channel-demodulation on the detected data according to a predetermined demodulation scheme (for example, 16-to-8 demodulation) and ECC decodes the channel demodulated data.

The codec 210 transforms an input signal into a signal format suitable for recording on a digital VCR tape during recording and transforms error correction decoded data provided from the channel demodulator and ECC decoder 208 into the signal format used when recording data on a digital VCR tape, to provide playback data during reproducing.

Meanwhile, the intra picture detector 212 in the codec 210 detects intra picture data from the error correction decoded data, which is provided from the channel demodulator and ECC decoder 208, during a period of the normal speed playback operation starting in response to a variable speed playback control signal CON, which is generated by the controller 200 in the variable speed playback mode selected by a user. The controller 200 recognizes a normal mode or a variable speed playback mode NORMAL/TRICK which is selected by a user interface. Then, the intra picture detector 212 provides an intra picture detection enable signal EN to the controller 200. A group of picture (GOP) detector which detects data in GOP units may be used as the intra picture detector 212.

With reference to FIGS. 3A through 4C, a variable speed playback method according to the present invention will now be described. The present invention intends to perform variable speed playback operation while minimizing the addition of new functions or circuits. In other words, the variable playback can be implemented in such a manner that the speed of a fast transfer operation is fixed to a predetermined multiple-speed and the amount of time of the fast transfer operation (hereinafter, named a "fast transfer period") is controlled in proportion to the predetermined multiple-speed. Alternatively, the variable playback can be implemented in such a manner that a fast transfer period is fixed to a predetermined value and a transfer speed is varied. In the present invention, the former method is used as an example as shown in FIGS. 3A through 3C.

FIG. 3A shows a recording medium which is helically scanned by a head, that is, a magnetic tape. FIG. 3B shows an operational principle of a low multiple speed playback mode in which the speed during a fast transfer period is fixed to a predetermined multiple-speed and the time of the fast transfer period is controlled in proportion to the multiple-speed. The operational principle of a high multiple-speed playback mode is shown in FIG. 3C. It can be seen that the time of a fast transfer period 1 is longer in the high multiple-speed playback mode than in the low multiple-speed playback mode.

During a normal speed playback operation (hereinafter, called a "normal playback period" 3) shown in FIGS. 3B and 3C, the codec 210 of FIG. 2 reconstructs one frame, that is, one picture so that it can process enough data to update the content displayed on a monitor. Taking into account an MPEG-2 data structure, it is most preferable to reproduce an intra picture, which can be independently decoded regardless of adjacent frames, and transmit the intra picture to the monitor for display. Hence, the codec 210 is provided with the built-in intra picture detector 212. However, instead of an intra picture, one GOP can be reproduced during the normal playback period 3 and displayed on the monitor.

A transition period 2 is the amount of time necessary for transition from the fast transfer period 1 to the normal playback period 3 and varies according to the performance of the transfer unit 202 or the controller 200 of FIG. 2. Since a fast transfer operation and a normal speed playback operation are sequentially performed, the present invention is more effective during fast variable speed playback than slow variable speed playback.

FIGS. 4A through 4C are detailed timing diagrams of variable speed playback according to the present invention. The timing diagram will be described with reference to the controller 200, the transfer unit 202, the codec 210 and the intra picture detector 212 of FIG. 2. Once a user selects a variable speed playback mode, the controller 200 generates a variable speed playback control signal CON corresponding to the selected variable speed playback mode and controls the lengths of a fast transfer period 1, a transition period 2 and a normal playback period 3 according to the variable speed playback control signal CON, as shown in FIG. 48.

More specifically, the fast transfer period 1 is established according to a multiple-speed. The transition period 2 is established for transition from the fast transfer period 1 to the stable normal playback period 3. The normal playback period 3 must be established such that enough data is reproduced to completely reconstruct at least one frame, that is, one picture during the normal playback period 3.

When a logic high variable speed playback control signal CON as shown in FIG. 4B is provided from the controller 200, the intra picture detector 212 detects only intra picture data I-F from playback data shown in FIG. 4A during the normal playback period 3. Once the intra picture I-F is detected, the intra picture detector 212 provides an intra picture detection enable signal EN, as shown in FIG. 4C, to the controller 200. The controller 200 changes to a fast transfer operation mode as soon as the intra picture detection enable signal EN is disabled and controls a fast transfer operation to be performed. Repetition of such operations realizes variable speed playback and a high multiple-speed which is faster than the transfer speed of a tape during normal speed playback. An intra picture can be detected during the fast transfer period 1 shown in FIG. 4B, but intra pictures detected during periods other than the normal playback period 3 are ignored.

Accordingly, the controller 200 uses the intra picture detection enable signal EN, which is provided from the intra picture detector 212 during the normal playback period 3, as a reference signal for controlling the transfer unit 202. In other words, the controller 200 can adaptively control the normal playback period 3 according to a multiple-speed of a variable speed mode in response to the intra picture detection enable signal EN.

Additionally, when using the method in which a fast transfer period is fixed to a predetermined value and a transfer speed is varied, the transfer speed of a tape can be adaptively controlled using a normal playback period and a desired multiple-speed.

The present invention encompasses variable speed playback of an apparatus which records and/or plays back data of an MPEG structure, and more particularly to, a home type digital VCR which records and/or plays back data of the MPEG structure, a structure which is essential to the introduction of digital TV broadcasting. As described above, the present invention is effective in easily implementing variable speed playback without increasing the cost or structural complication of products.

What is claimed is:

1. A variable speed playback method for helical scanning and playing back digital data stored in a recording medium, the method comprising the steps of:
   (a) performing a fast transfer operation on the recording medium in response to a variable speed mode; and
   (b) playing back data stored in the recording medium at a normal playback speed after the fast transfer operation,
   wherein the step (a) of performing a fast transfer operation and the step (b) of playing back data stored in the recording medium at a normal playback speed are repeatedly performed, thereby realizing variable speed playback;
   wherein the data used for the variable speed playback is extracted from normal playback data stored in the recording medium.

2. The method of claim 1, wherein, in the step (a), a speed of the fast transfer operation is fixed to a predetermined multiple-speed and a time period of the fast transfer operation is controlled in proportion to the multiple-speed of the variable speed mode.

3. The method of claim 1, wherein, in the step (a), a time period of the fast transfer operation is fixed to a predetermined value and a speed of the fast transfer operation is varied in response to the variable speed mode.

4. The method of claim 3, wherein, in the step (a), the speed of the fast transfer operation is adaptively controlled according to a desired multiple-speed and a time period of the normal playback operation.

5. The method of claim 1, wherein, in the step (b), at least one picture is normally played back during each period of the normal playback operation.

6. The method of claim 1, wherein the digital data has a Moving Picture Experts Group (MPEG) structure.

7. The method of claim 6, wherein, in the step (b), at least one intra picture is extracted and normally played back during each period of the normal playback operation.

8. The method of claim 7, wherein the period of the normal playback operation is adaptively controlled starting from a time point when the intra picture is extracted.

9. The method of claim 6, wherein, in the step (b), at least one piece of group of picture (GOP) data is extracted and normally played back during each period of the normal playback operation.

10. The method of claim 1, wherein the variable speed mode is selected by a user interface.

11. A variable speed playback apparatus for helically scanning and playing back digital data stored in a recording medium, the apparatus comprising:
   a transfer unit for moving the recording medium;
   a controller for controlling the transfer unit so as to repeatedly perform a fast transfer operation for moving the recording medium at a high speed and a normal playback operation for playing back the data of the recording medium at a normal playback speed after the fast transfer operation, thereby realizing variable speed playback; and
   a restoring unit for reconstructing data, which is read from the recording medium during each period of the normal playback operation, to at least one picture of display data;
   wherein the data used for the variable speed playback is extracted from normal playback data stored in the recording medium.

12. The apparatus of claim 11, wherein the controller generates a variable speed playback control signal to repeat a period of the fast transfer operation, wherein the period depends on a multiple-speed, a transition period which is required for transition from the fast transfer operation to the normal playback operation, and a period of the normal playback operation; and provides the variable speed playback control signal to the restoring unit.

13. The apparatus of claim 11, wherein the controller fixes a speed of the fast transfer operation to a predetermined multiple-speed and controls a time period of the fast transfer operation in proportion to a multiple-speed of the variable speed mode.

14. The apparatus of claim 11, wherein the controller fixes a time period of the fast transfer operation to a predetermined value and varies a speed of the fast transfer operation in response to the variable speed mode.

15. The apparatus of claim 14, wherein the controller adaptively controls the speed of the fast transfer operation according to a desired multiple-speed and a time period of the normal playback operation.

16. The apparatus of claim 11, wherein the restoring unit normally plays back at least one picture during each period of the normal playback operation.

17. The apparatus of claim 11, wherein the digital data has a Moving Picture Experts Group (MPEG) structure.

18. The apparatus of claim 17, wherein the restoring unit extracts and normally plays back at least one intra picture during each period of the normal playback operation.

19. The apparatus of claim 18, wherein the restoring unit provides a detection enable signal to the controller when an intra picture is extracted during the period of the normal playback operation, and the controller uses the detection enable signal as a reference signal for controlling the transfer unit.

20. The apparatus of claim 19, wherein the controller adaptively controls the period of the normal playback operation according to a multiple-speed of the variable speed mode in response to the detection enable signal.

21. The apparatus of claim 17, wherein the restoring unit extracts and normally plays back at least one piece of group of picture (GOP) data during each period of the normal playback operation.

22. A variable speed playback method for playing back digital data stored in a recording medium, the method comprising the steps of:

(a) performing a fast data retrieval operation on the recording medium in response to a variable speed mode; and (b) playing back data stored in the recording medium at a normal playback speed after the fast data retrieval operation, wherein the step (a) of a fast data retrieval operation and the step (b) of a normal playback operation are repeatedly performed, thereby realizing variable speed playback;

wherein the data used for the variable speed playback is extracted from normal playback data stored in the recording medium.

23. The method of claim 22, wherein the variable speed playback is selected by a user interface.

24. The method of claim 22, wherein, in the step (a), a speed of the fast data retrieval operation is fixed to a predetermined multiple-speed and a time period of the fast data retrieval operation is controlled in proportion to the multiple-speed of the variable speed mode.

25. The method of claim 22, wherein, in the step (a), a time period of the fast data retrieval operation is fixed to a predetermined value and a speed of the fast data retrieval operation is varied in response to the variable speed mode.

26. The method of claim 25, wherein, in the step (a), the speed of the fast data retrieval operation is adaptively controlled according to a desired multiple-speed and a time period of the normal playback operation.

27. The method of claim 22, wherein at least one picture is normally played back during the normal playback operation.

28. The method of claim 22, wherein at least one intra picture of a data compression structure is extracted and normally played back during each period of the normal playback operation.

29. A variable speed playback apparatus for playing back digital data stored in a recording medium, the apparatus comprising:

a controller for controlling a data retrieval unit so as to repeatedly perform a fast data retrieval operation for accessing the recording medium at a high speed and a normal playback operation for playing back the data of the recording medium at a normal playback speed after the fast data retrieval operation, thereby realizing variable speed playback; and a restoring unit for reconstructing data, which is read from the recording medium during each period of the normal playback operation;

wherein the data used for the variable speed playback is extracted from normal playback data stored in the recording medium.

30. The apparatus of claim 29, wherein the controller generates a variable speed playback control signal to repeat a period of the fast data retrieval operation, a transition period which is required for transition from the fast data retrieval operation to the normal playback operation, and a period of the normal playback operation; and provides the variable speed playback control signal to the restoring unit.

31. The apparatus of claim 29, wherein the controller fixes a speed of the fast data retrieval operation to a predetermined multiple-speed and controls a time period of the fast data retrieval operation in proportion to a multiple-speed of the variable speed mode.

32. The apparatus of claim 29, wherein the controller fixes a time period of the fast data retrieval operation to a predetermined value and varies a speed of the fast data retrieval operation in response to the variable speed mode.

33. The apparatus of claim 32, wherein the controller adaptively controls the speed of the fast data retrieval operation according to a desired multiple-speed and a time period of the normal playback operation.

34. The apparatus of claim 29, wherein at least one picture is normally played back during the normal playback operation.

35. The apparatus of claim 29, wherein, at least one intra picture of a data compression structure is extracted and normally played back during each period of the normal playback operation.

* * * * *